(No Model.)  2 Sheets—Sheet 1.

J. F. MARTIN.
COUPLING FOR TUBULAR INSULATORS FOR ELECTRIC WIRES.

No. 286,941.  Patented Oct. 16, 1883.

(No Model.) 2 Sheets—Sheet 2.
J. F. MARTIN.
COUPLING FOR TUBULAR INSULATORS FOR ELECTRIC WIRES.
No. 286,941. Patented Oct. 16, 1883.
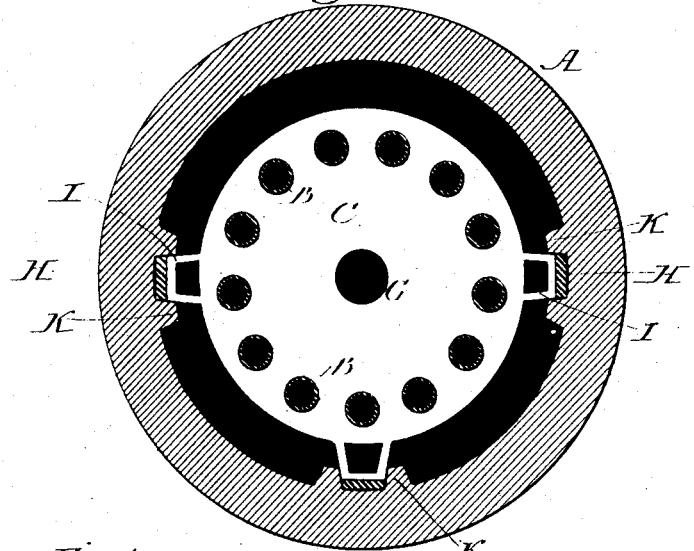
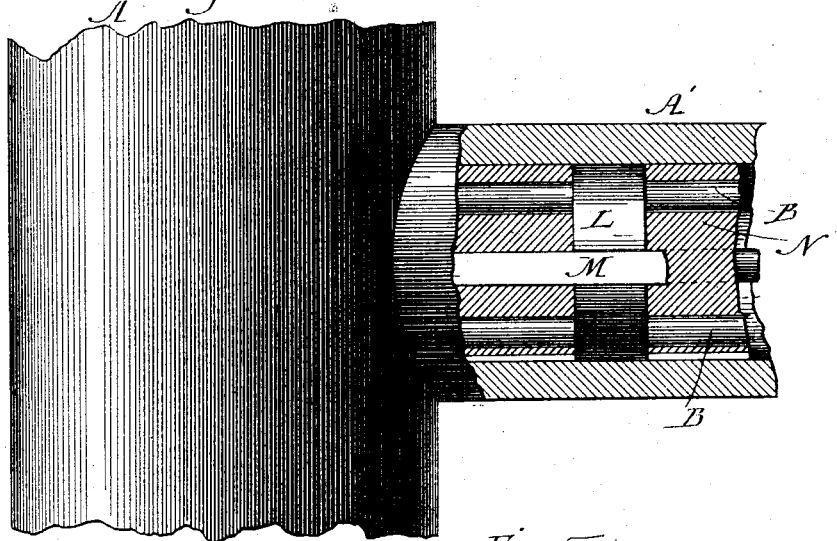
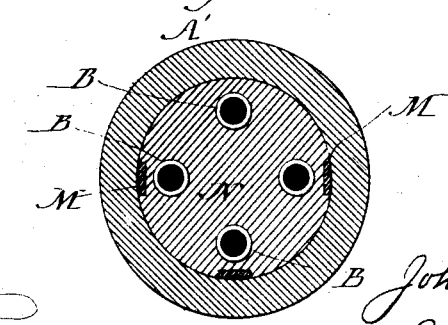
Witnesses:
Frank D. Blanchard
Will R. Anshundro
Inventor:
John F. Martin
By Jno. G. Elliott
Attorney.

UNITED STATES PATENT OFFICE.

JOHN F. MARTIN, OF CHICAGO, ILLINOIS.

COUPLING FOR TUBULAR INSULATORS FOR ELECTRIC WIRES.

SPECIFICATION forming part of Letters Patent No. 286,941, dated October 16, 1883.

Application filed March 12, 1883. (No model.)

*To all whom it may concern:*

Be it known that I, JOHN F. MARTIN, a citizen of the United States, residing in Chicago, county of Cook, and State of Illinois, have invented certain new and useful Improvements in Couplings for Tubular Insulators for Electric Wires, of which the following is a specification.

This invention relates to means for coupling tubular insulators which are provided for electric wires within an underground conduit; and it has for its object to provide tight and effective joints at the meeting ends of the tube-sections, which constitute continuous lines of tubing; also, to admit of any desired number of straight parallel tube-sections being readily introduced into the conduit-pipe, and, further, to efficiently support and hold the lines of tubing apart to insulate the same at their joints, and to provide for a circulation of air through the conduit-pipe, all as hereinafter fully described, and illustrated in the annexed drawings, in which—

Figure 1:
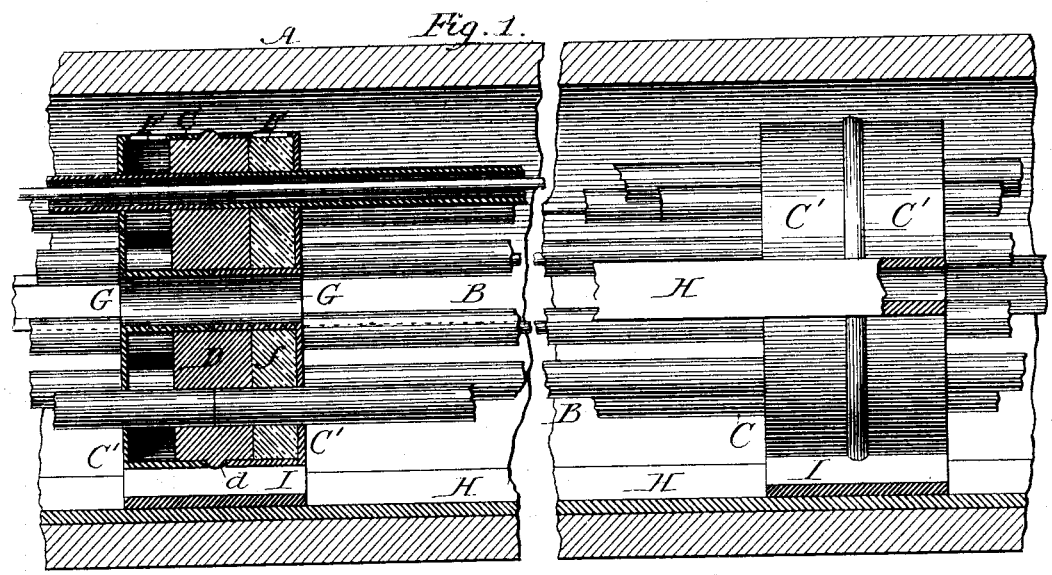
Figure 2:
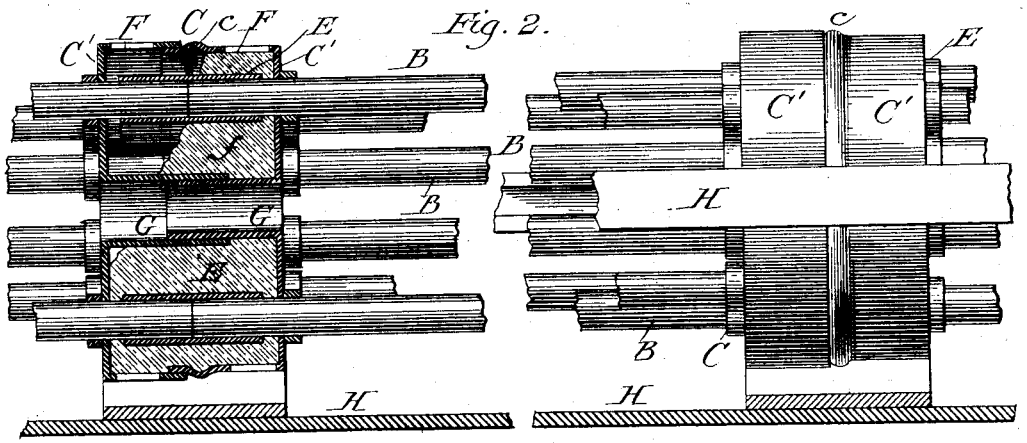

Figure 1 represents a longitudinal section through a conduit-pipe, with two of my improved coupling-boxes inclosed, one of said boxes being shown in section, and the connections between the two boxes and the tubes being shown broken away. Fig. 2 is a similar view, with a slightly different form of coupling, a portion of the conduit-pipe being shown. Fig. 3 is a transverse section through the conduit-pipe, and an end view of one of the coupling-boxes. Fig. 4 is a plan view of a portion of the main conduit-pipe, and a longitudinal section, taken on a horizontal plane, through a branch pipe, with its inclosed support for the insulating-tubes shown in top or plan view. Fig. 5 is a cross-section through the said branch pipe.

Referring by letter to the drawings, in which like letters denote like parts, A indicates a section of the conduit-pipe, which can be made of terra-cotta or other suitable material. The insulating-tubes B for the wires are made in sections, which are connected together so as to form continuous lines of tubing. In order to couple these tube-sections together so as to form tight joints and keep the lines of tubing separate from each other, I provide couplings C at such points in the conduit as may be required. These couplings are each composed of a two-part cylindrical box or case provided with closed perforated ends, and having its cylindrical sections C' fitted or held together, so as to bring the perforations in its ends coincident with each other, and thereby allow the ends of the tubes, which are inserted in the box from its ends, to meet within the box and form continuous lines of tubing. The meeting ends of the insulating-tubes are either fitted within the openings of a perforated disk, D, as shown in Fig. 1, or in short sleeves E, as shown in Fig. 2, the result in either case being that the joints at the junctions of the tubes are each closely surrounded by a cylindrical wall or bearing, which can be made of any preferred insulating material—such, for example, as paper or asphaltum. Where a perforated disk is employed, as shown in Fig. 1, the two parts of the box, which are in the nature of caps, are fitted upon the disk so that their ends shall meet, or nearly meet, upon the perimeter of the latter. The insulating-tubes are then passed through the perforated ends of the box and inserted in the perforations of the disk, so that the opposing ends of said tubes shall meet within the disk, after which the spaces within the box at the sides of the disk are filled up with asphaltum or some suitable insulating cement or compound, each part of the box being provided with a peripheral opening, F, through which the insulating compound can be introduced. In Fig. 2 the meeting ends of the two parts of the box are shown lapped, and an annular bead, e, formed upon one of said parts, so as to form a shoulder, against which the end of the remaining part of the box will abut. The box in the case is also provided with openings F, through which the cement or insulating compound is introduced; but in lieu of the disk I provide coupling-sleeves E, into which the ends of the insulating-tubes are inserted, so as to meet in the same way as in the case of the disk hereinbefore described. It will be seen in this instance that the cement filled into the box will support the sleeves E and hold them firmly in place. In either case the insulating-cement will hold the two parts of the box together, and keep the perforated disks or sleeves in place, and also that it will hold the tube-sections rigidly together and effectively exclude all moisture from the joints. A passage is formed longitudinally through the center of the box by providing each one of its sections with a tube, G, open at both ends. These tubes are secured in the perforated ends, and can either meet or couple with each other when the two parts of the box are fitted together. Where the perforated disk D is employed, as in Fig. 1, said disk will be provided with a central opening, and the tubes fitted within said opening. When, however, sleeves are employed for inclosing the joints at the junction of the insulating-tubes, as in Fig. 2, the tubes G can be fitted one within the other, as shown. While these tubes G, which are partially embedded in the cement, serve as an additional means for holding the two points of the box together, they also serve to form a passage through the box for the circulation of air, which can be created by fans or blowers or other means in any suitable way—such, for example, as set forth in other applications which I have made for Letters Patent. The disk D is preferably provided with a rib, d, against which the inner ends of the sections of the box abut, whereby, in fitting the said section upon the disk, the latter can be properly centered within the box. Two, or as many more as may be desired, of these coupling-boxes are connected together by means of longitudinal strips H, which are shown broken away in order to expose certain portions of the couplings. These longitudinal strips are secured to ears I, provided upon one of the parts of each coupling-box, as illustrated in Fig. 3. The insulating-tubes are usually coupled, by means of the devices hereinbefore described, prior to placing the tubes and coupling devices within the pipes of a conduit; and in order to admit of the insulating-tubes with their couplings being passed into the conduit-pipe without liability of any twisting or of torsional strain upon the tubes, I provide the conduit-pipe with internal parallel longitudinal grooves, which are preferably formed in ribs K, made to extend from end to end of the pipe-section. These grooves are adapted to receive the strips H, which connect the coupling-boxes together, and also, by preference, portions of the ears I, to which said strips are attached. This mode of supporting and centering the coupling-boxes within the conduit-pipe not only prevents the boxes from being turned, either during or after their introduction into the pipe, but also provides for a space between the boxes and the pipe for the circulation of air. Where a branch pipe, A', is connected with the main conduit-pipe, as in Fig. 4, and a circulation of air through the branch pipe is not needed, the insulating-tubes provided within the branch pipe can be passed through perforations in a disk, L, fitted within the pipe, and the space left within the latter filled up with some insulating-cement. Two or more of these disks will preferably be connected by strips M, which are received in grooves in the pipe, whereby the disks thus connected can be passed into the pipe without any danger of twisting the insulating-tubes. After thus inserting the disks and tubes in the branch pipe the filling N can be introduced, in any convenient way, either at the ends or through side openings in the pipe.

Having thus described my invention, what I claim, and desire to secure by Letters Patent, is—

1. A coupling for tubular insulators for electric wires, consisting of a box adapted to receive the ends of the tubes and also to contain a filling of some insulating compound, substantially as described.

2. The two-part coupling-box for tubular insulators for electric wires, provided with perforated ends for the insertion of the tubes and with means for allowing the introduction of some insulating compound into the box, substantially as described.

3. The two-part coupling-box for tubular insulators for electric wires, provided with perforated ends for introducing the tubes, an opening extending centrally through the box for the passage of air, and side openings through which an insulating compound can be introduced into the box, substantially as described.

4. The combination, with a coupling-box for tubular insulators for electric wires, provided with perforated ends through which the wires are introduced, of means, substantially as described, for covering the joints at the junction of the tube-sections within the box, substantially as described.

5. The combination, with a coupling-box having perforated ends for the insertion of insulating-tubes for electric wires, of an inner support or supports in which the meeting ends of the tubes are fitted, and a filling of some insulating compound in which portions of the tubes are embedded, substantially as described.

6. The coupling-box for tubular insulators for electric wires, provided with means, substantially as described, for holding the opposing ends of the tube together, so as to form separate continuous lines of tubing, and further provided with a peripheral set of ears adapted to fit in longitudinal grooves in a conduit-pipe, for the purpose described.

7. The combination, with a conduit-pipe provided with internal longitudinal grooves, of two or more coupling-boxes for tubular insulators for electric wires, connected together by longitudinal strips which are adapted to fit in the grooves in the conduit-pipe, substantially as described.

8. The combination, with a coupling-box for tubular insulators for electric wires, provided with perforated ends, and composed of two sections, c', adapted to be fitted together, as described, of the central perforated disk, D, or equivalent support, and the cement filling $f$ at the sides of said disk or support, substantially as and for the purpose described.

9. The combination, with the two-part coupling-box for tubular insulators for electric wires, of the tube G, adapted to fit together substantially as described, said box being provided with side openings for the introduction of an insulating compound, and with end openings through which the insulating-tubes are passed into the box, for the purpose specified.

10. The combination, with a branch pipe leading from the main pipe of a conduit for electric wires, of tubular insulators passing through perforated supports in the branch pipe, and a filling, N, of some insulating compound, substantially as described.

JOHN F. MARTIN.

Witnesses:
W. W. ELLIOTT,
JNO. G. ELLIOTT.